March 7, 1933.  G. W. BUTTS  1,900,756
METHOD OF ASSEMBLING AND TRANSPORTING STACKED ARTICLES
Original Filed April 11, 1931  3 Sheets-Sheet 1
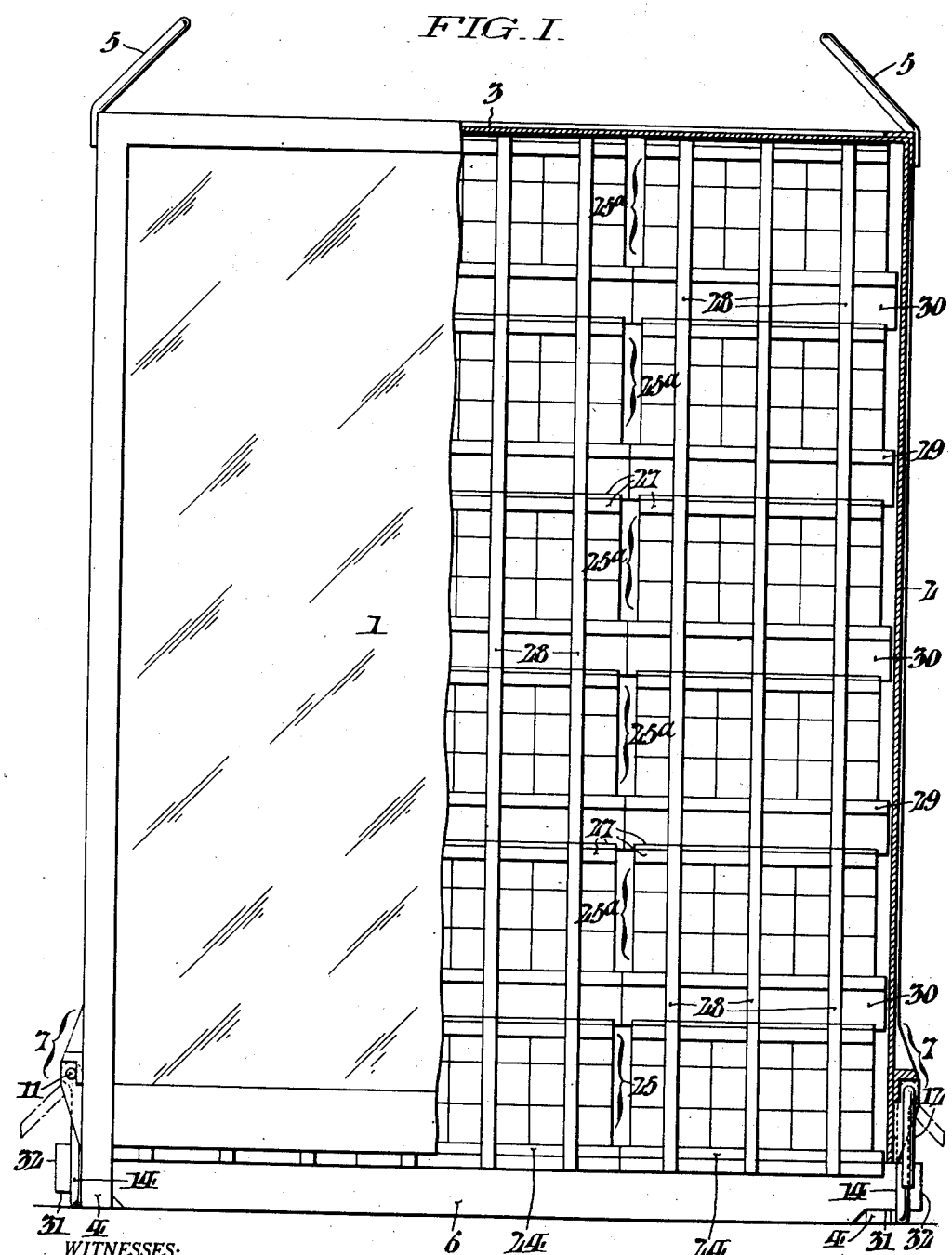
FIG. I
WITNESSES:
INVENTOR:
George W. Butts,
BY
ATTORNEYS.

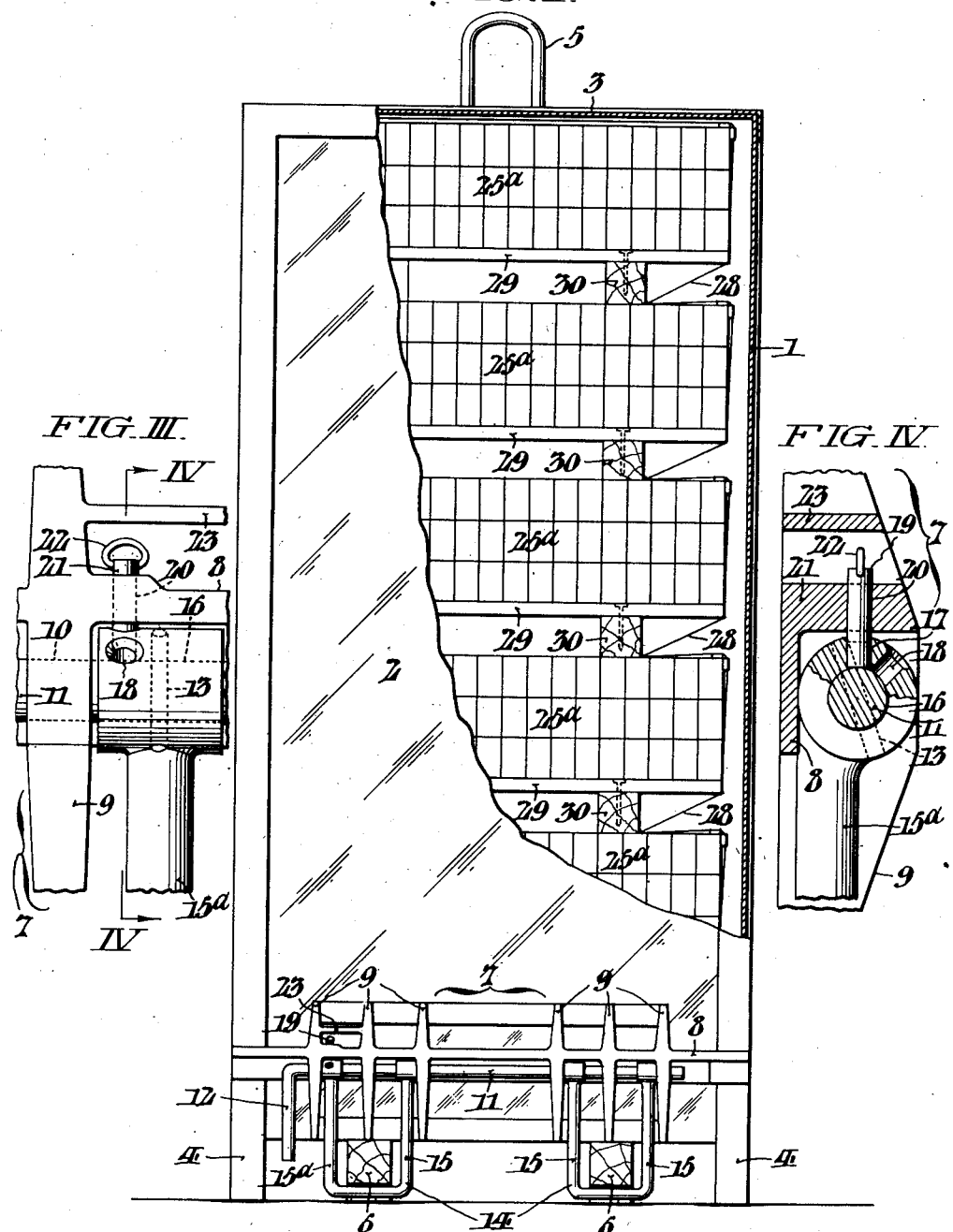

March 7, 1933. G. W. BUTTS 1,900,756
METHOD OF ASSEMBLING AND TRANSPORTING STACKED ARTICLES
Original Filed April 11, 1931 3 Sheets-Sheet 3
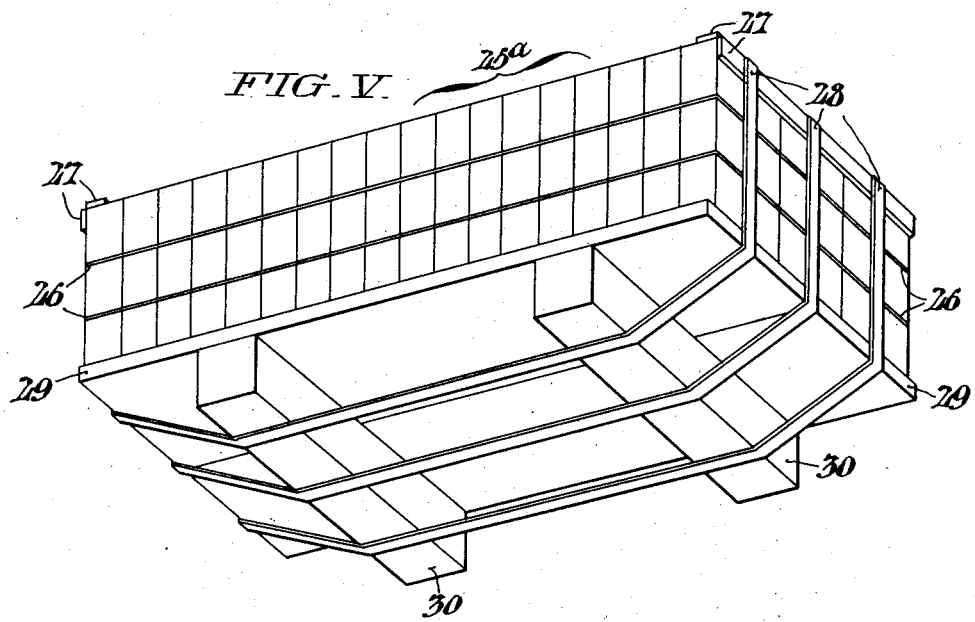
FIG. V.
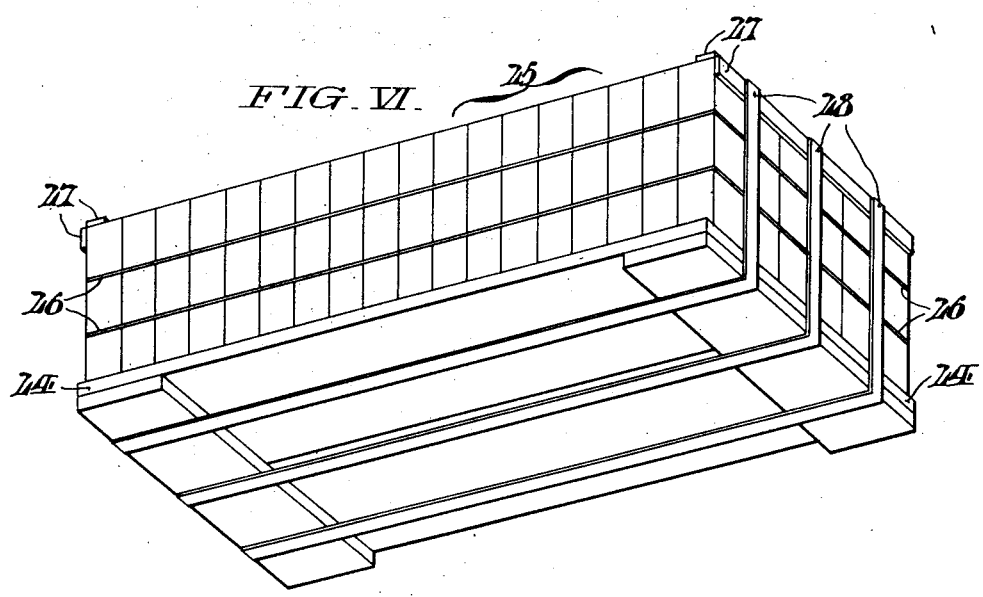
FIG. VI.
WITNESSES:
INVENTOR:
George W. Butts,
BY
ATTORNEYS.

Patented Mar. 7, 1933

1,900,756

UNITED STATES PATENT OFFICE

GEORGE W. BUTTS, OF WYNNEWOOD, PENNSYLVANIA, ASSIGNOR TO PENNSYLVANIA RAILROAD COMPANY, A CORPORATION OF PENNSYLVANIA

METHOD OF ASSEMBLING AND TRANSPORTING STACKED ARTICLES

Original application filed April 11, 1931, Serial No. 529,532. Divided and this application filed October 17, 1931. Serial No. 569,534.

This invention relates to methods of assembling and transporting stacked articles, such as bricks or the like, and the present application constitutes a division of my pending application for U. S. Letters Patent, Serial No. 529,532, filed April 11, 1931.

More particularly, the invention relates to shipping containers of the type used on railroad cars, motor trucks, or trailers. Containers of this type are commonly made to such dimensions that a multiple of them arranged side by side may be conveniently accommodated on the floor of a freight car.

Heretofore, for the transportation of bricks or the like, it has been common practice to employ containers with drop doors and to dump the lading at destination by opening the doors and allowing the contents to fall out indiscriminately. This manner of dumping the container contents involves considerable breakage and is particularly undesirable in connection with the transportation of high grade bricks, such as face bricks.

One object of the present invention, generally stated, is to provide a method of transporting bricks or other stacked articles in a complete package which remains intact not only during transit upon vehicles, but also during the operations of loading the articles within the shipping containers and of unloading the articles from the containers.

Another object of the invention is to provide a method of assembling a complete package of stacked articles within a bottomless container, the method being characterized by making up the complete package of a plurality of lading units, which supply a temporary platform for the container, with each lading unit separately bound and secured to its own platform so that, after the complete package is removed from the container, the individual lading units may still be kept intact for further handling.

Still another and more specific object of the invention is to provide a container having side and end walls, a top, and no bottom, and further characterized by means which are attached to opposite walls of the container and are adapted to engage and release load-carrying members extending across the bottom of the container.

Other objects and advantages characteristic of my invention will become more fully apparent from the description of a container which embodies the invention and from the further description of an example of the manner in which the container may be used in a transportation system, which description follows hereinafter and has reference to the accompanying drawings.

Of the drawings:

Fig. I represents a side elevation of a container embodying features of my invention, a portion of the side wall being broken away to show the interior of the container and the manner in which a package of bricks is loaded therein.

Fig. II represents an end view of the same with a portion of the end wall broken away.

Fig. III represents an enlarged view of a part of a load suporting casting at the bottom of the container.

Fig. IV represents a cross section of the same, taken as indicated by the lines IV—IV in Fig. III.

Fig. V represents a perspective view of one individual stack of bricks from one of the upper tiers of the complete brick package; and, Fig. VI represents a perspective view of an individual stack from the lowest tier of the complete brick package.

The container shown in the drawings and selected as an example of this invention, is a railroad container having such dimensions that when arranged side by side with other similar containers on the floor of a freight car, the lot of containers substantially occupies the complete floor space of the car. The container frame is shaped in the form of a box and comprises generally side walls 1, end walls 2, a top 3, and corner posts 4, by which the side and end walls are joined together. At the top of the container a pair of opposed loops 5 are provided, there being one loop at the center of each end wall. The loops 5 serve as means by which the container may be engaged and lifted by hoisting apparatus.

It will be noted that the corner posts 4 extend beneath the bottom edges of the side walls 1 and end walls 2, thus furnishing at their bottom ends four legs with a substantial space between the ground and the bottom edges of the side and ends walls. The container has no bottom, and within the space adjacent to the bottom ends of the corners posts 4, load-carrying members in the form of wooden beams 6 are disposed across the bottom of the container frame, these members serving to support the contents of the container.

On each end wall 2 there is mounted near the bottom thereof a bracket or casting 7 which extends across the end wall of the container from one corner post 4 to another. This bracket or casting 7 includes a horizontal angle member 8 and a series of vertical ribs 9 formed integrally therewith. Each rib 9 is perforated at 10, as shown in Fig. III, the perforations forming a bearing for a shaft 11 which serves as the operating device for connecting and disconnecting the load-carrying members 6 with the bottom of the container. At one end the shaft 11 terminates in a handle 12, and this handle is desirably located near a corner of the container. Mounted on each shaft 11, and fixed thereto by means of pins 13, shown in Fig. III, are two U-shaped links 14 which normally extend downward in a vertical direction to engage the load-carrying beams 6. The vertical ribs 9 of each bracket or casting 7 project beyond and substantially house the pivotal connections of the links 14, and thus guard the links 14, as well as the shaft 11, against possible injury which might be occasioned by one container being struck at its end by another container.

As shown in Figs. II, III and IV, the arms 15 of each link 14 are formed at their ends with a rounded portion having a central opening 16 through which the shaft 11 passes, the link arms 15 being made fast on the shaft 11 by means of the pins 13 which are driven with a forced fit. Extending radially from the central opening 16 to the edge of the rounded end of the special link arm which is designated at 15a, this being the link arm nearest the operating handle 12, there are two notches 17 and 18 spaced apart by an angle of approximately 45°. The tapered end of a pin 19 is adapted to be inserted alternatively within the notch 17 or the notch 18 according to whether it is desired to lock the links 14 in a vertical position in which the ends of the beams 6 are engaged by the links, or whether it is desired to lock the links in an outwardly swung position in which the ends of the beams 6 are released. The body portion of the pin 19 is accommodated within a perforation 20 in the horizontal leg 21 of the angle member 8. At the top, the pin 19 is provided with a ring 22 which can be conveniently grasped when it is desired to lift the pin. Immediately above the top of the pin 19 there is a ledge 23 on the casting 7, the ledge 23 serving as a stop preventing the pin 19 from being withdrawn in an upward direction. The pin 19 is inserted within the perforation 20 before the shaft 11 and links 14 are attached thereto, and when the pin has been inserted the ring 22 is applied to the top of the pin.

To release the load-carrying beams 6, the operator places his left hand on the handle 12 and his right hand on the pin 19. He then raises the pin 19 from the notch 17 with his right hand and swings the handle 12 outward with his left hand. After the shaft 11 has turned through an angle of 45°, the pin will automatically drop into the notch 18 and cause the links 14 to be locked in released or outwardly swung position. To engage the load-carrying beams 6, the operator raises the pin 19 from the notch 18 with his right hand, which allows the links 14 to fall by gravity, returning the shaft 11 to its original vertical position. After the links 14 have resumed a vertical position, the pin 19 will automatically drop into the notch 17 and cause the links 14 to be locked in vertical position with the load-carrying beams 6 properly engaged.

The package of bricks is preferably assembled for transportation in the manner shown in Figs. I, II, V and VI. First, the load-carrying beams 6 are placed on the ground in parallel spaced relation. Across the top of these beams a plurality of lading platforms 24, there being three such platforms shown in the drawings, are loosely mounted. These platforms 24 are properly centered with respect to the beams 6 but are preferably not attached thereto by any fastening means. On each lading platform 24 an individual stack of bricks 25, substantially occupying the full space of the platform, is piled up in the manner shown. Between horizontal layers of bricks, suitable packing 26 is inserted to prevent contact between one layer and another, and thus to minimize breakage. Each individual stack 25 is also preferably bound together as a lading unit by means of laths 27 placed at the top edges of the stacks and metal bands 28 which surround the laths 27 and the lading platform 24 and make a separate unit of each individual stack.

Above the lowest tier of bricks, comprising three individual stacks 25, each separately bound and mounted on lading platforms 24, I have shown a second, third, fourth, fifth and sixth tier of bricks, the stacks 25a of which are similarly assembled but mounted on a different type of platform 29, as shown in Fig. V. The platforms 29 have underlying beams 30 fastened thereto, and they serve to space the stacks of the upper tiers from each other and from those of the lowest tier. These individual stacks 25a are of a size especially convenient to the builder and are adapted for handling on small hand trucks, elevators and the like; and it is for this reason that I prefer to assemble the complete container package by placing side by side and in vertical tiers a plurality of small individual lading units rather than to mount a single large stack on a single platform. The complete package shown in the drawings comprises eighteen such separate lading units.

After the package has been assembled in the manner described, the container is lowered directly over it and allowed to rest on the ground. In this position the load-carrying beams 6 extend outward beyond the end walls 2 where they may be engaged by the pivotally mounted links 14. The ends of the beams 6 are preferably cut away at 31 to accommodate the bottom of the links 14, and the container equipment and beams 6 are so proportioned as to vertical dimensions that when the container rests upon level ground the beam ends 32 will clear the bottom of the links 14, as shown in Fig. II, so that the load of the brick package is not transferred to the container until the container has been lifted a short distance above the ground. Accordingly, there is no difficulty in swinging the links into and out of engagement with the beams 6.

When the links 14 have been caused to engage the beam ends 32 and have been locked in vertical position, the container is ready to be hoisted and transported by any suitable conveyance to destination. At its ultimate destination the container is unloaded by raising the locking pins 19 at each end and turning the operating handles 12. When each handle 12 has been turned through the desired angle and locked in outwardly swung position, the container is ready to be raised with the brick package resting on the ground.

The removal of the individual stacks 25, 25a from the complete brick package can be accomplished by suitable grappling devices engaging the platforms 24 or 29. Each stack 25, 25a may be kept intact in its own platform as long as desired and moved by hand truck or other means to any desired location before being disassembled.

While I have described a preferred method of handling and transporting packages of bricks, it will be apparent that the particular manner of assembling and carrying these articles in a container may be varied considerably without departing from the spirit of my invention as defined in the claims hereto annexed. For example, my invention contemplates the provision of metal lading platforms and load-carrying beams, the arrangement of individual brick stacks in a variety of combinations, and the use of the container for the transportion of many articles other than bricks.

Having thus described my invention, I claim:

1. A method of loading stacked articles into a bottomless container which consists in arranging the articles in separate individual stacks, each stack being mounted on a separate lading platform and said stacks and platforms being placed side by side whereby the platforms collectively afford a temporary bottom for a container, lowering a container over said stacks, and securing said temporary bottom to the walls of the container.

2. A method of loading stacked articles into a bottomless container which consists in arranging the articles in separate individual stacks, each stack being mounted on and bound to a separate lading platform, and said stacks and platforms being placed side by side and in tiers whereby certain of the platforms collectively afford a temporary bottom for a container, and others afford spacing members horizontally separating the stacks from each other, lowering a container over said stacks, and securing the lowermost platforms to the walls of the container.

3. A method of loading stacked articles into a bottomless container which consists in loosely mounting a plurality of separate lading platforms side by side on load-carrying members, arranging articles in separate individual stacks on said platforms, each stack being separately bound and secured to a lading platform and the platforms collectively affording a temporary bottom for a container, lowering a container over said stacks, and securing said load-carrying members to the walls of the container.

In testimony whereof, I have hereunto signed my name at Philadelphia, Pennsylvania, this 13th day of October 1931.

GEORGE W. BUTTS.